(12) United States Patent
Cole

(10) Patent No.: US 7,979,506 B2
(45) Date of Patent: Jul. 12, 2011

(54) SYSTEM AND METHOD FOR RESTRICTIVELY EXCHANGE PRODUCT DATA BETWEEN COMMUNICATION DEVICES OF A LIMITED-USER NETWORK

(76) Inventor: Robert James Cole, San Mateo, CA (US)

( * ) Notice: Subject to any disclaimer, the term of this patent is extended or adjusted under 35 U.S.C. 154(b) by 43 days.

(21) Appl. No.: 12/583,037

(22) Filed: Aug. 12, 2009

(65) Prior Publication Data

US 2010/0042701 A1 Feb. 18, 2010

Related U.S. Application Data

(60) Provisional application No. 61/188,837, filed on Aug. 12, 2008.

(51) Int. Cl.
 *G06F 15/16* (2006.01)
 *G06F 15/173* (2006.01)
 *G06F 15/177* (2006.01)
(52) U.S. Cl. .............. 709/217; 705/37; 705/28; 705/80; 705/330
(58) Field of Classification Search .......... 709/217–224; 705/28, 27, 80, 330
 See application file for complete search history.

(56) References Cited

U.S. PATENT DOCUMENTS

| | | | |
|---|---|---|---|
| 3,573,747 A | 4/1971 | Adams et al. | |
| 3,581,072 A | 5/1971 | Nymeyer | |
| 4,789,928 A | 12/1988 | Fujisaki | |
| 5,077,665 A | 12/1991 | Silverman et al. | |
| 5,136,501 A | 8/1992 | Silverman et al. | |
| 5,243,515 A | 9/1993 | Lee | |
| 5,521,815 A | 5/1996 | Rose, Jr. | |
| 5,611,047 A | 3/1997 | Wakamiya et al. | |
| 5,634,048 A | 5/1997 | Ryu et al. | |
| 5,640,569 A | 6/1997 | Miller et al. | |
| 5,694,594 A | 12/1997 | Chang | |
| 5,727,129 A | 3/1998 | Barrett et al. | |
| 5,727,165 A | 3/1998 | Ordish et al. | |
| 5,754,938 A | 5/1998 | Herz et al. | |
| 5,758,328 A | 5/1998 | Giovannoli | |
| 5,761,662 A | 6/1998 | Dasan | |
| 5,774,873 A | 6/1998 | Berent et al. | |
| 5,796,952 A | 8/1998 | Davis et al. | |
| 5,826,244 A | 10/1998 | Huberman | |
| 5,845,265 A | 12/1998 | Woolston | |
| 5,893,091 A | 4/1999 | Hunt et al. | |
| 5,978,776 A | 11/1999 | Seretti et al. | |
| 6,920,433 B1 | 7/2005 | Seretti et al. | |
| 2005/0171896 A1 | 8/2005 | Seretti et al. | |
| 2005/0256780 A1* | 11/2005 | Eldred | 705/26 |
| 2006/0195428 A1* | 8/2006 | Peckover | 707/3 |
| 2007/0130052 A1 | 6/2007 | Seretti et al. | |
| 2007/0244797 A1* | 10/2007 | Hinson et al. | 705/37 |
| 2007/0250327 A1* | 10/2007 | Hedy | 705/1 |

(Continued)

*Primary Examiner* — Haresh N Patel

(57) ABSTRACT

A novel and non-trivial system and method for restrictively exchanging product data between communication devices of a limited-user network is disclosed. A processor in communication with a plurality of user communication devices of a limited-user network is used for controlling and restricting the exchange of product data. In such network, the processor may establish a communication connection with an initiating communication device of an initiating user, receive initiating product data from the initiating communication device and corresponding first users (e.g., defined trusted users) data, provide the initiating product data to at least one available first user communication device, receive responding product data responsive to the initiating product data, and provide the responding product data to the initiating communication device. Additionally, the processor may provide interested users who have not been defined as trusted users with the initiating product data and receive responding product data from such interested users.

18 Claims, 9 Drawing Sheets

U.S. PATENT DOCUMENTS

| | | | |
|---|---|---|---|
| 2008/0103943 A1* | 5/2008 | Williams et al. | 705/28 |
| 2008/0215475 A1* | 9/2008 | Ramer et al. | 705/37 |
| 2008/0270163 A1* | 10/2008 | Green | 705/1 |
| 2009/0006118 A1* | 1/2009 | Pollak | 705/1 |
| 2009/0043685 A1* | 2/2009 | Benjamin et al. | 705/37 |
| 2009/0138378 A1* | 5/2009 | Suba et al. | 705/27 |
| 2009/0327101 A1* | 12/2009 | Sayed | 705/27 |
| 2010/0088158 A1* | 4/2010 | Pollack | 705/10 |
| 2010/0114790 A1* | 5/2010 | Strimling et al. | 705/330 |
| 2010/0241575 A1* | 9/2010 | Cotton et al. | 705/80 |

* cited by examiner

| Users | Dealership Name | Distance | Rating | Trusted | Invite |
|---|---|---|---|---|---|
| Alice Valid | Valid Auto | 2.4 Miles | 8.9 | ☑ | ☐ |
| Arlo Valid | Valid Auto | 2.4 Miles | 7.0 | ☑ | ☐ |
| Bill Jones | Jones Auto Sales | 36.2 Miles | 2.5 | ☐ | ☐ |
| Bob Smith | Smith Auto Market | 119.2 Miles | 4.8 | ☑ | ☐ |
| Charles White | White's Used Cars | 25.2 Miles | 9.0 | ☑ | ☐ |
| James Black | Black's New Cars | 12.7 Miles | 9.5 | ☐ | ☑ |
| Paul Jones | Jones Auto Sales | 36.2 Miles | 7.8 | ☑ | ☐ |
| Steve Moon | Moon's Car Sales | 23.7 Miles | 8.3 | ☐ | ☑ |
| Tom Sun | Sun Pre-Owned Cars | 9.8 Miles | 6.1 | ☑ | ☐ |

Guest Invite (enter e-mail address):

Tabs: Appraising | Selling | Buying | Inventory | Network Users

FIG. 2

Tabs: Appraising | Selling | Buying | Inventory | Network Users

Make:
Model:
Year:

VIN:
Respond by Date:
Respond by Time:

Body Style:
Color:
Interior:
Exterior:
Odometer:

Engine:
Glass:
General:
Tires:
Add Image

Other Equipment:
Remarks:

FIG. 3

| Appraising | Selling | Buying | Inventory | Network Users |

Make:     Model:     Year:     VIN:
Toyota      Camry     2000     STCBY16871A580908

Appraisal/Price Quote:    Buy    Respond by Date:    Respond by Time:    Track VIN

FIG. 4

| Appraising | Selling | Buying | Inventory | Network Users |

Make:    Model:    Year:    Price Quote:    Select from Inventory

VIN:    Respond by Date:    Respond by Time:

Body Style:    Color:    Interior:    Exterior:    Odometer:

Engine:    Glass:    General:    Tires:    Add Image

Other Equipment:    Remarks:

FIG. 5

| Appraising | Selling | Buying | Inventory | Network Users |

| Year | Make/Model | | Days in Inventory | Status |
|---|---|---|---|---|
| 2001 | 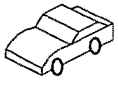 | Land Rover Discovery<br>96423.0 Miles, Java Black/Bahama Beige<br>w/Leather Seat Trim<br>   VIN: SALTY15481A298163   Stock#: 2226 | 11 | Unlisted<br>Create Listing |
| 2003 |  | Aston Martin Vanquish<br>2355.0 Miles, Almond Green/Arctic Blue w/<br>Connolly Leather Seat Trim or ...<br>   VIN: SCFAC23343B500587   Stock#: 333 | 24 | Listed<br>View Listing |
| 2004 |  | Jaguar S-TYPE<br>34000.0 Miles, White Onyx/Charcoal w/<br>Leather Seat Trim<br>   VIN: SAJEA03V341M96892   Stock#: 2225 | 17 | Listed<br>View Listing |

FIG. 6

| Appraising | Selling | Buying | Inventory | Network Users |

| Make: | Model: | Year: | VIN: |
|---|---|---|---|
| Toyota | Camry | 2000 | STCBY16871A580908 |

Price Quote:     Respond by Date:     Respond by Time:

FIG. 7

| Appraising | Selling | Buying | Inventory | Network Users |

Make:     Model:     Year:

Respond by Date:     Respond by Time:

Body Style:     Color:     Interior:     Exterior:     Odometer:

Engine:     Glass:     General:     Tires:

Other Equipment:     Remarks:

FIG. 8

| Appraising | Selling | Buying | Inventory | Network Users |

Make: Toyota     Model: Camry     Year: 2000     Price Quote:     Select from Inventory

VIN:     Respond by Date:     Respond by Time:

Body Style:     Color:     Interior:     Exterior:     Odometer:

Engine:     Glass:     General:     Tires:     Add Image

Other Equipment:     Remarks:

FIG. 9

| Appraising | Selling | Buying | Inventory | Network Users |

| Trusted Users | Dealership Name | Select | Distance |
|---|---|---|---|
| Alice Valid | Valid Auto | ☑ | 2.4 Miles |
| Arlo Valid | Valid Auto | ☐ | 2.4 Miles |
| Bob Smith | Smith Auto Market | ☑ | 119.2 Miles |
| Charles White | White's Used Cars | ☐ | 25.2 Miles |
| Paul Jones | Jones Auto Sales | ☑ | 36.2 Miles |
| Tom Sun | Sun Pre-Owned Cars | ☑ | 9.8 Miles |

FIG. 10

SYSTEM AND METHOD FOR RESTRICTIVELY EXCHANGE PRODUCT DATA BETWEEN COMMUNICATION DEVICES OF A LIMITED-USER NETWORK

CROSS-REFERENCE TO RELATED APPLICATIONS

This application claims priority to U.S. Provisional Application No. 61/188,837 filed Aug. 12, 2008 entitled "Apparatus and Method for Conducting Trusted Network Transactions" which is incorporated by reference.

BACKGROUND OF THE INVENTION

1. Field of the Invention

This invention pertains to a data exchange system of products in the spot marketplace of a limited-user, electronic commerce, network. Although not limiting, the disclosures herein are drawn to a vehicular data exchange system so that one user may restrict his or her transactions to defined trusted users of the network. Also, the system permits others who have not been defined as trusted users to conduct transactions if the products of the transactions match a product in which the non-defined user has expressed an interest.

2. Description of the Related Art

When purchasing a product the purchaser must first determine which product best meets his or her needs. For example, one may be interested in purchasing a vehicle having a specific make, model, color, price, and/or installed equipment of the vehicle. Such criteria may vary widely between purchasers. Once the purchaser has established interest in a particular product, he or she may shop for the products by using the internet, calling a vendor, or visiting a brick-and-mortar store of those who sell the product to determine, for instance, the best price. Today, consumers and businesses alike are using the internet to shop for products online to determine the best price as well as conducting purchases at both retail and wholesale price points. While the internet serves as a valuable sales channel for many products such as commodities, the internet has shown limited success with regard to purchasing other products such as used vehicles where the value of such product is affected by criteria such as depreciation and current condition.

Marketplace-oriented websites that provide user rating features help overcome concerns about the reputations of both buyers and sellers. These rating features have helped websites such as eBayMotors.com transact millions of items over the Internet, many of those transactions involving used vehicles. While millions of consumers may buy and sell vehicles online, there are other instances where buyers such as car dealers will not purchase used vehicles online without an inspection being conducted. As a result, existing online exchange services designed to support car dealers for the purposes of wholesaling used vehicles have not become widely accepted and adopted. Instead, leading wholesale provider Manheim Auctions Inc. conducts physical auctions and manages an estimated five million (5,000,000) wholesale used vehicle transactions annually. While the physical auction indicates a degree of success, its dealer-dedicated online auction known as "Online Vehicle Exchange" manages only an estimated thirty-nine thousand (39,000) used vehicle transactions annually by comparison as of Jun. 10, 2008. In spite of providing an estimated ten-fold savings, physical auctions are preferable. One of the factors contributing to the lack of usage of the online process may be attributed to the failure of the online process to gain the trust of those who participate.

Unlike a consumer who purchases one or more vehicles every three to five years, car dealers maximize profit by selling high margin vehicles at the expense of low or no margin vehicles. This requires a juggling act of making room for in-demand vehicles by clearing the lot of aging inventory. This may require the liquidation or acquisition of a considerable volume of used vehicles at wholesale. While a consumer is mainly concerned with condition and price, he or she is not concerned with turning a profit. Consumer tolerance for quality-to-price comparison in the retail marketplace is greater than a car dealer participating in the wholesale marketplace who cannot afford to make mistakes and suffer a loss or reduced profit margins. As such, car dealers are reluctant to use on-line vehicle trading solutions to conduct wholesale transactions. Factors which contribute to this reluctance may include a lack of knowledge of the trading dealer or a lack of trust. Car dealers would rather conduct a pre-purchase inspection of a vehicle, communicate directly with other car dealers they know and trust (i.e., trade partners), and attend physical auctions dedicated to the trade in the wholesale marketplace. Wholesaling vehicles is an expensive and time consuming process.

Often times, dealers play phone tag daily with a small group of other dealers whom they know and trust. Dealers may contact these direct trade partners when attempting to obtain appraisal values and buy bids for trade-in vehicles, liquidate aging inventory vehicles that are taking up precious lot space that higher demand used vehicles could occupy, and procure higher demand replacement inventory vehicles. In many cases, dealers may make wholesale commitments with trusted trade partners without seeing a vehicle. In most cases, the most reliable real-time communications device remains the telephone. Because of this reliance, the process of wholesaling vehicles is severely limited and difficult to manage.

The telephone limits wholesale channel exposure and visibility for car dealers, which reduces wholesale values. A dealer may be reluctant to call other dealers of whom they do not know, but yet he or she is definitely interested in trade opportunities and might pay a higher price for any given vehicle. The telephone also limits the ability to conduct many transactions in a short period and to negotiate separately with multiple parties simultaneously.

Computer-based communications over a network, however, can be used to contact multiple parties simultaneously more efficiency without a telephone. For example, a computer-based communications network of buyer and vendor members for processing requests for goods and/or services from network members and for linking buyers to sellers has been disclosed by Giovannoli in U.S. Pat. No. 5,758,328 entitled "Computerized Quotation System and Method." The invention in Giovannoli has created the opportunity for buyers to relate to vendors without a structure operating through a centralized computer database. Requests for goods and/or services are broadcast to network members over the Internet with no centralized database of goods and/or prices involved; instead, requests for quotations are transmitted based upon filter conditions set by the buyer and/or seller, and/or network operator. The filter compatible to seller's responses are either directly communication to the buyer or to the computerized system which transmits the received quote to the requesting buyer. There is no central pricing database to limit the number of buyers and vendors of goods and services or to limit the number of goods and services which can be processed. By joining the network, all vendors are potential class members no matter where in the world they are located. The network is a routing service with the routing being controlled by class description filters which can be specified by the buyer, the network computer, and the vendors.

An electronic on-line motor vehicle auction information system has been disclosed by Berent et al in U.S. Pat. No. 5,774,873 entitled "Electronic On-line Motor Vehicle Auction and Information System." The invention relates to commercial motor vehicles auctions (sellers) of vehicles which have been assembled at one or more remote locations by a motor vehicle company. The process allows on-line participation and provides participants (buyers) with access to auction-related data. The system allows the dealer or other remote user to sign on to a host network from the user's PC through a remote access server. An SQL server attached to the host computer contains a relational database of auction data and responds to information queries initiated by the user. The electronic motor vehicle auction and auction information system provides interactive on-line services to remote users who may enter queries about vehicle sale information sale schedules, auction pricing, and vehicle stock availability, and who may "bid" for vehicles electronically against other users.

A vehicular data exchange system has been disclosed by Seretti et al in U.S. Pat. Nos. 5,978,776 and 6,920,433 (both entitled "Vehicular Data Exchange System and Method Therefor"). The invention relates to a vehicular data exchange system so that users of such system can, within a brief period of time, simply and easily exchange vehicle data with one another for the purposes of buying and selling motor vehicles and/or obtaining appraisal data for motor vehicles. Characteristics of a vehicle are inputted into a computer terminal by an initiating user, and financial information is inputted into a computer terminal by a responding user after receiving and in response to the vehicular characteristics data.

Despite the advances in communication and the exchange of product data in an electronic commerce network, there is a need for an on-line exchange system that mitigates trust issues currently affecting the adoption of the electronic commerce network by enhancing communications between dealers who know and trust each other more efficiently than telephone communication. Also, trust issues can be mitigated by connecting dealers who do not know each other but who may be "pre-qualified" by possessing a high rating based on a favorable and positive feedback of previous transactions.

There is a need for an initiating dealer such as a seller to be able to field responses from known trade partners and other users who are unknown to the initiating dealer; to choose who they do business with whether the initiating user is selling, or buying, or exchanging appraisal, or price quote information per vehicle; and to accomplish these activities in ways that do not require a transaction guarantee. Also, there is a need for an efficient way to search and locate listed vehicles offered by trusted trade partners of the network. Also, there is a need for car dealers to use the Internet to contact other known and/or unknown dealers, as needed, to obtain appraisal price information and to submit buy offers (bids) on used vehicles when attempting to provide competitive wholesale price quotes to their customers who are trading their vehicles in against the purchase of another more desirable vehicle.

Finally, there is a need for an on-line exchange system for affectivity reducing the need for car dealers to attend physical auctions to reduce expenses and time to market, which ultimately reduces exposure to value depreciation. The presence of business relationships between trusted partners can assist in reducing these expenses.

BRIEF SUMMARY OF THE INVENTION

It is an object of this invention to provide timely dissemination of product data to defined trusted users, to non-defined trusted users who have expressed an interest in a particular product, or both.

It is another object of this invention to allow the initiating user the ability to choose and/or negotiate with any of the responding users without being forced to use the "highest bidder."

It is another object of this invention to allow the user to select and de-select trusted users; to invite, accept, or decline users as trusted users; or to invite non-network guests to use the network with the opportunity to establishing a trusted relationship.

It is another object of this invention to allow the user to select and de-select trusted users based upon ratings determined through feedback of users involved in previous transactions.

It is another object of this invention to allow the initiating users and responding users to use any communication device available to the user including portable communication devices for communicating product characteristics and financial information, thereby increasing the efficiency at which a transaction may occur.

BRIEF DESCRIPTION OF THE DRAWINGS

FIG. 2 depicts an illustration of a sample display screen.

FIG. 3 depicts an illustration of a sample screen display within an "Appraising" tab of a main navigation bar.

FIG. 4 depicts an illustration of a second sample screen display within an "Appraising" tab of a main navigation bar.

FIG. 5 depicts an illustration of a sample screen display within a "Selling" tab of a main navigation bar.

FIG. 6 depicts an illustration of a sample screen display within an "Inventory" tab of a main navigation bar.

FIG. 7 depicts an illustration of a sample screen display within a "Buying" tab of a main navigation bar.

FIG. 8 depicts an illustration of a second sample screen within a "Buying" tab of a main navigation bar.

FIG. 9 depicts an illustration of a second sample screen display within a "Selling" tab of a main navigation bar.

FIG. 10 depicts an illustration of a third sample screen display within an "Appraising" tab of a main navigation bar.

The drawings of FIG. 11 depict a flowchart 200 of an example of a method for restrictively exchanging vehicular data between communication devices of a limited-user network

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
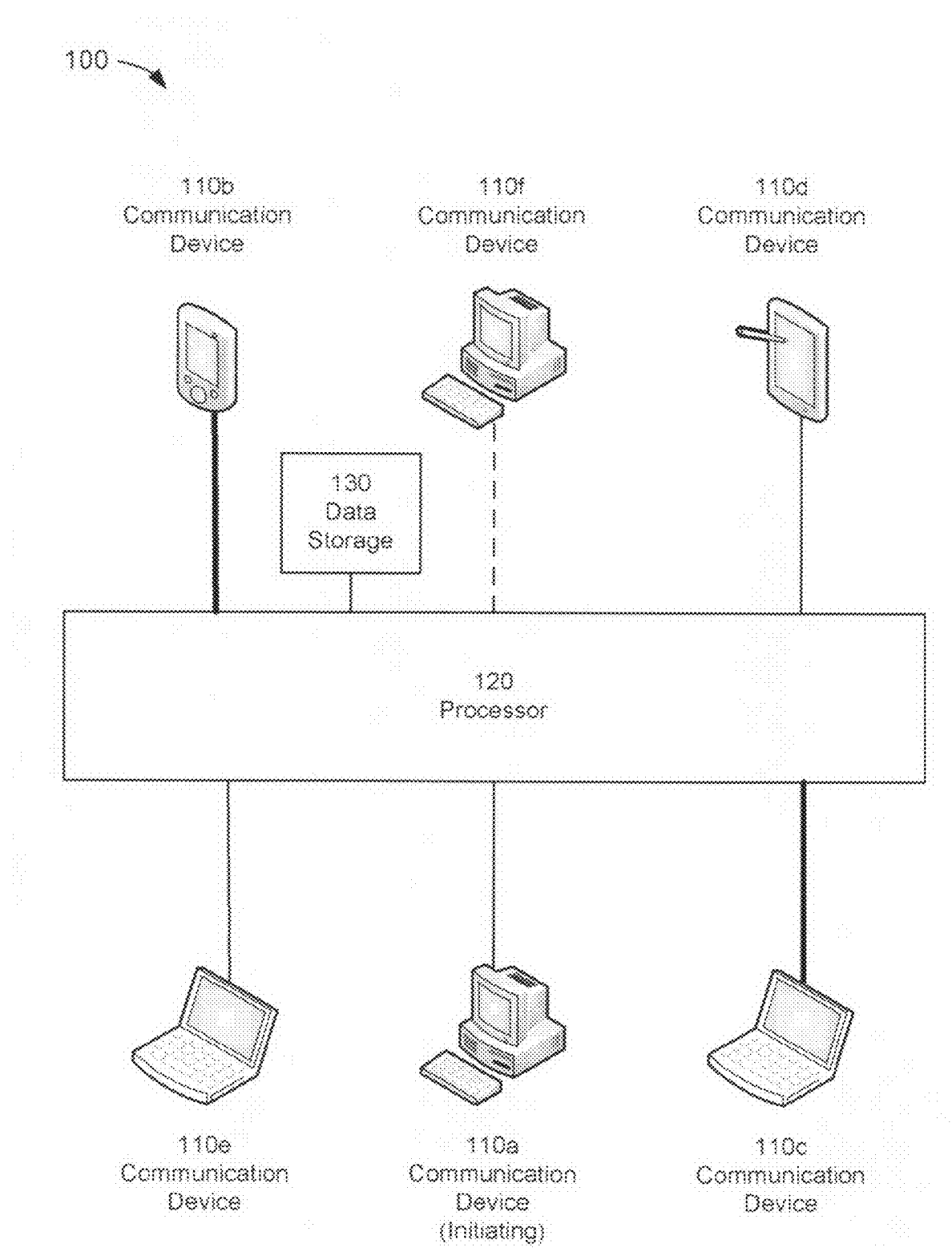
FIG. 1 depicts a block diagram of communication system 100 for restrictively exchanging product data between communication devices of a limited-user network.

FIG. 1 depicts a block diagram of communication system 100 for restrictively exchanging product data between communication devices of a limited-user network suitable for implementation of the techniques described herein. The limited-user data exchange system 100 of an embodiment of FIG. 1 could include a plurality of user communication devices 110, a processor 120, and a storage device 130. It should be noted that, although the discussion herein will be drawn to an exchange of vehicular data, relating to motor vehicles, planes, trains, earth movers, etc. . . . , the embodiments herein are not limited to vehicles but may be employed for any spot market trading in products and/or goods through the exchange of product data and/or goods data.

In an embodiment of FIG. 1, user communication devices 110*a* through 110*f* may be used as an input device, output device, or both for users of a limited network. As shown in FIG. 1, an input device may be any one of a plurality of devices available to a user for inputting vehicular information into the network controlled processor 120, and an output device may be any one of a plurality of devices available to a user for receiving vehicular information from the network controlled processor 120. For the purpose of illustration and not limitation, a user communication device 110 could include, but is not limited to, a personal computer 110*a* and 110*f*, a personal data assistant 110*b*, a laptop 110*c* and 110*e*, and a tablet 110*d*. Also, a user communication device could comprise any device on which a user may input information using voice and/or push-button input and/or receive output information via a recorded voice including, but not limited to, a telephone, where such input is converted to provide data representative of such information prior to being provided to a processor 120 and such output data is converted to provide intelligible information to a user.

As embodied herein, a limited-user network could be established over any private and/or public network, wired and/or wireless, in which a processor 120 may receive and/or control the exchange of data representative of vehicular information between one or more communication devices 110 employed by users. As embodied herein, a processor 120 may be any electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PC Card, secure digital cards, and compact flash cards. A processor 120 may be driven by the execution of software or source code containing algorithms developed for the specific functions embodied herein. Common examples of electronic data processing units are microprocessors, Digital Signal Processors (DSPs), Programmable Logic Devices (PLDs), Programmable Gate Arrays (PGAs), and signal generators; however, for the embodiments herein, the term processor is not limited to such processing units and its meaning is not intended to be construed narrowly. For instance, a processor could also consist of more than one electronic data processing units.

In an embodiment of FIG. 1, data storage device 130 could be employed for storing data associated with a limited-user exchange system 100. As embodied herein, the data storage device 130 could include any device into which a processor 120 may store and/or retrieve data including, but not limited to, a database or any of the previously-stated digital memory storage devices or computer-readable media. It should be noted that, although the discussion herein will be drawn to a database, the embodiments herein are not limited to a database.

A database may be used to store user characteristics data such as contact information and ratings based on trading behavior, and vehicular characteristics data that may include characteristics that identify the vehicle as a depreciating asset such as year, make, model, and mileage (i.e., odometer reading) and may include criteria to identify current condition including a rating scale (e.g., 1 through 10), sales data such as final selling price, and any offers that are being tracked based on the Vehicle Identification Number ("VIN"). Data may also be used for identifying the current status of the data such as listed, or unlisted, sold, or eligible for re-list, or pending transaction etc.

A database may be used to record user performance. For example, after each transaction, processor 120 could provide a feedback form to the users who, in turn, may rate the other user on a scale (e.g., 1 through 10, where 1 could mean poor and 10 could mean outstanding). Each rating could be recorded or stored in a data storage device 130, and processor 120 could track ratings and determine a individual rating of each user based on cumulative feedback. Users with numerous transactions combined with positive feedback may improve their rating. An outstanding or other high rating based on user responses to trade behavior may generate more business opportunities. For example, outstanding user rating may prompt other users to invite such well-rated user to become a trade partner. Users can refer other users to the system and invite users who are on the system to become trade partners. Users that receive invitations to join one's trusted partner group who, in turn, may accept or decline such invitation. Also, a user may wish to invite one who is not a user of the network to join the network or accept a guest pass to use the network on a limited-time basis. The rating system combined with the ability to receive and maintain responses from known trusted users could enable the initiating user to effectively determine which buying, selling, and appraisal opportunities are most suitable to his or her needs.

In an embodiment of FIG. 1, a processor 120 is shown in communication with a plurality of user communication devices 110 of the limited-user network by lines of various thicknesses or patterns. The difference in line thickness could represent whether a processor 120 has established communications with a communication device of a trusted user, a communication device of an interested user, or communication device of a user who is neither a trusted user nor an interested user. As embodied herein, the thicker lines depicted between processor 120 and user communication devices 110*b* and 110*c* could indicate that the users of communication devices 110*b* and 110*c* are trusted users as defined by the user of initiating communication device 110*a*. The thinner lines depicted between processor 120 and user communication devices 110*d* and 110*e* could indicate that the users of communication devices 110*d* and 110*e* are interested users who are not defined as trusted users but interested in a vehicle specified by the user of initiating communication device 110*a*. The dashed line depicted between processor 120 and communication device 110*f* could indicate that the user of communication device 110*f* has not been identified as either a trusted user or an interested user.

The advantages and benefits of the embodiments of a limited-user data exchange system 100 disclosed herein may be illustrated by depicting examples of data fields into which user and/or vehicular information may be inputted into a user communication device 110 of a user in a limited-user network. It should be noted that, although the examples depicted herein are drawn to a communication device having a display and employing a graphical-user interface ("GUI"), the embodiments herein are not limited to such communication device.

FIG. 2 is an illustration of a sample display screen that could be displayed on a communication device. Near the top of the screen is a main navigation bar comprising tabs labeled "Appraising," "Selling," Buying, "Inventory," and "Network Users"; this main navigation bar will be used repeatedly in FIGS. 2 through 9, inclusive. It should be noted that the sample screen displays and the information presented thereon have been intentionally abbreviated for the sake of discussion and illustration only. Those skilled in the art are aware that a plethora of screen display configurations are available for input and output. The presentation of the sample screen displays shown in the drawings herein are not considered as limitations of the embodiments disclosed herein.

In an embodiment of FIG. 2, the illustration presents a sample screen display which could appear when working within a "Network Users" tab of the main navigation bar. An illustrative list is shown for providing information related to the plurality of users of a limited-user network from which a user may select trusted users. As embodied herein, a processor 120 could control and maintain information relating to the users of the network, and provide such data to a user device for display. For the purpose of illustration and not limitation, the list contains information corresponding to four data fields: Users, Dealership Name, Distance, Rating, Trusted, and Invite. Under each data field, there are nine entries. As indicated by the boxes with checked marks in the "Trusted" column, a user has selected six of the nine "Users" as trusted users. Using this screen, a user is capable of adding users to his or her trusted network by selecting a box in the "Trusted" column or removing users by de-selecting a box. In one embodiment, data representative of user-selected trusted users may be received by a processor 120, stored in a data storage device 130, and retrieved as necessary. In another embodiment, data representative of user-selected trusted users may be stored in the user's communication device 110.

As shown in FIG. 2, James Black and Steve Moon have not been selected as trusted users but have relatively high ratings: 9.5 and 8.3, respectively. As discussed above, these ratings could be have been determined by processor 120 based on the user feedback of past transactions. Based on these high ratings, a user may wish to establish a business relationship and extend an invitation to each to join his trusted user group. As indicated by the boxes with checked marks in the "Invite" column, processor 120 could receive data representative of the invitation from the user's communication device and provided such data to the invitees' communication devices. Along with receiving the invitation, the invitees may also be enabled with the ability to accept or decline the invitation, where processor 120 could receive data representative of the acceptance or decline from the invitees' communication devices and automatically update the user's trusted user group accordingly. On a different display, a user could review a list of those users who consider him or her a trusted user and remove himself or herself from being a trusted user of those users by utilizing de-selection means.

As shown in FIG. 2, someone who is not a member of the limited-user network could be invited to become a member as a guest user on a limited-time basis. A user may wish to establish a business relationship who is not a member of the network and extend an invitation to such person to be a guest user of the network, for instance, by entering the person's e-mail address. Once entered and received by processor 120, data representative of the invitation may be sent to the person. Along with receiving the invitation, the guest invitee may also be enabled with the ability to accept or decline the invitation, where processor 120 could receive data representative of the acceptance or decline from the invitee's communication device and automatically update the user's trusted user group accordingly on a limited-time basis while adding the guest user to the network.

In an embodiment of FIG. 3, the illustration presents a sample screen display which could appear when working within an "Appraising" tab of the main navigation bar. This sample screen display could be accessed, for example, when a user wants to obtain an appraisal of a vehicle from the trusted users he or she has selected. A plurality of fields is depicted, where each field corresponds to a vehicular characteristics data unit of a vehicle. Using one or more of these fields, a user may input vehicular characteristics data units of a vehicle including, but not limited to, make, model, year, vehicle identification number ("VIN"), a response date and time, body style, color, condition of the interior and exterior, odometer mileage, engine condition, glass condition, general overall condition, tire condition, other equipment installed, and remarks. Also, a user could add or include an image(s) of the vehicle as a vehicular characteristics data unit. As embodied herein, one or more of the fields depicted in the drawings herein could employ one or more user GUIs to assist with the inputting of data including, but not limited to, drop-down lists and combo boxes. After the user has completed inputting some or all of the vehicular characteristics data units into the user's communication device 110, data representative of such units may be provided by such device to processor 120 for subsequent routing of such data to the user communication devices of the network 100. As embodied herein, such routing could be limited to devices of trusted users. Also, such routing could include any user who is interested in buying a vehicle matching the vehicular characteristics data units as determined by processor 120, where such buying activity is described below in FIG. 8.

In an embodiment of FIG. 4, the illustration presents a second sample screen display which could appear when working within an "Appraising" tab of the main navigation bar. This screen could be used by a user responding to an initiating user who inputted vehicular characteristics data units using the sample screen display of FIG. 3. As observed in FIG. 4, some of the fields have been pre-populated with vehicular characteristics data units (it is assumed that the initiating user is seeking an appraisal for a 2000 Toyota Camry with the VIN STCBY16871A580908). Although not depicted in the drawing, other vehicular characteristics data units inputted by the initiating user may be provided to the responding user. As understood by those skilled in the art, any screen display requiring a response of a user may be made conspicuous to alert or in some way demand the attention of the responding user, especially if there is an opportunity where time is of the essence. In one example, the screen display or fields on the display of a responding user's device could be made to flash or have different colors. In another example, an alarm or notification sound could be generated by a responding user's device.

Using the "Appraisal/Price Quote" field, a responding user may input a vehicular financial data unit corresponding to the vehicle such as an appraisal value. If the responding user is interested in buying the vehicle, he could indicate an offer, for example, by selecting a box under the "Buy" and inputting a response date such as a bid amount and time as part of the vehicular financial data units. In addition to submitting a bid amount, the responding user may select "Track VIN" for future notification should the same VIN re-appear in the network in a subsequent transaction; for instance, where a first initiating user fails to acquire the vehicle and a second initiating user inputs the same VIN information at a later time. Should this occur, processor 120 could provide the responding user with the vehicular characteristics data units inputted by the second initiating user. It should be noted that, although the term "Price Offer" will be used herein to reflect a financial data unit, other terms could be used in its place including, but not limited to, bid price amount, assessment price amount, a wholesale price amount, and a retail price amount, where the use of a specific term could be tailored to the transaction being performed.

After the vehicular financial data unit(s) has been inputted into the responding user's communication device 110, data representative of such units may be provided by such device to processor 120 for subsequent routing of such data to the initiating user. Thereafter, an initiating user may be presented with vehicular financial data unit(s) information from one or more responding users. If one or more of the responses indicates an offer to buy, the screen display could be configured with a means for conveying the acceptance including, but not limited to, a button or link which accepts the offer when clicked; if an offer is accepted, this acceptance may be provided to processor 120 and routed to the communication device 110 of corresponding responding user, where the user is presented with the acceptance.

In an embodiment of FIG. 5, the illustration presents a sample screen display which could appear when working within a "Selling" tab of the main navigation bar. This sample screen display could be accessed when, for example, a user wants to sell a vehicle to the trusted users he or she has selected. A plurality of fields is depicted, where each field corresponds to a vehicular characteristics data unit of a vehicle. The plurality of fields is similar to those fields depicted in FIG. 3 and includes a price quote for selling the vehicle. A user may input information in one or more of the vehicular characteristics data unit corresponding to the vehicle. In another embodiment where inventory information could be stored in the user's communication device or capable of being retrieved by such device, a user could click on a button or link such as the "Select from Inventory" button to take the user to a "Inventory" tab on the main navigation bar where a sample screen display such as shown in FIG. 6 could be displayed. From this display, a user could click on a button or link such as the "Create Listing" button to populate the one or more of vehicular characteristics data unit fields of the "Selling" screen display of FIG. 5. After the user has completed inputting some or all of the vehicular characteristics data units of FIG. 5 into the user's communication device 110, data representative of such units may be provided by such device to processor 120 for subsequent routing of such data to the user communication devices of the network 100. As embodied herein, such routing could be limited to devices of trusted users. Also, such routing could include any user who is interested in buying a vehicle matching the vehicular characteristics data units as determined by processor 120, where such buying activity is described below in FIG. 8.

In an embodiment of FIG. 7, the illustration presents a sample screen display which could appear when working within a "Buying" tab of the main navigation bar. This screen could be used by a user responding to an initiating user who inputted vehicular characteristics data units using the sample screen display of FIG. 5. As observed in FIG. 7, some of the fields have been pre-populated with vehicular characteristics data units (it is assumed that the initiating user is seeking to sell a 2000 Toyota Camry with the VIN STCBY16871A580908). Although not depicted in the drawing, other vehicular characteristics data units inputted by the initiating user may be provided to the responding user. A responding user may input a vehicular financial data units corresponding such as price quote and response date and time.

After the vehicular financial data unit(s) has been inputted into the responding user's communication device 110, data representative of such units may be provided by such device to processor 120 for subsequent routing of such data to the initiating user. Thereafter, an initiating user may be presented with vehicular financial data unit(s) information from one or more responding users offering to buy. The screen display could be configured with a means for conveying the acceptance including, but not limited to, a button or link which accepts the offer when clicked; if an offer is accepted, this acceptance may be provided to processor 120 and routed to the communication device 110 of corresponding responding user, where the user is presented with the acceptance.

In an embodiment of FIG. 8, the illustration presents a second sample screen display which could appear when working within a "Buying" tab of the main navigation bar. This sample screen display could be accessed when, for example, a user wants to buy a vehicle from the trusted users he or she has selected. A plurality of fields is depicted, where each field corresponds to a vehicular characteristics data unit of a vehicle. The plurality of fields is similar to those fields depicted in FIGS. 3 and 5 but does not include unknown information or information not needed to buy a vehicle. A user may input information in one or more of the vehicular characteristics data unit corresponding to a vehicle. After the user has completed inputting some or all of the vehicular characteristics data units of FIG. 8 into the user's communication device 110, data representative of such units may be provided by such device to processor 120 for subsequent routing of such data to the user communication devices of the network 100. As embodied herein, such routing could be limited to devices of trusted users. Also, such routing could include any user who is interested in selling a vehicle matching the vehicular characteristics data units as determined by processor 120, where such selling activity was described above in FIG. 5.

In an embodiment of FIG. 9, the illustration presents a second sample screen display which could appear when working within a "Selling" tab of the main navigation bar. This screen could be used by a user responding to an initiating user who inputted vehicular characteristics data units using the sample screen display of FIG. 8. As observed in FIG. 9, some of the fields have been pre-populated with vehicular characteristics data units (it is assumed that the initiating user is seeking to buy a 2000 Toyota Camry). Vehicular characteristics data units inputted by the initiating user may be provided to the responding user. A responding user may input vehicular financial data units corresponding such as price quote and response date and time. Also, a responding user may input vehicular characteristics data units in the same or like fashion as described above in FIG. 5.

After the vehicular financial data unit(s) and vehicular characteristics data unit(s) have been inputted into the responding user's communication device 110, data representative of such units may be provided by such device to processor 120 for subsequent routing of such data to the initiating user. Thereafter, an initiating user may be presented with vehicular financial data unit(s) and vehicular characteristics data unit(s) information from one or more responding users offering to sell. The screen display could be configured with a means for conveying the acceptance including, but not limited to, a button or link which accepts the offer when clicked; if an offer is accepted, this acceptance may be provided to processor 120 and routed to the communication device 110 of corresponding responding user, where the user is presented with the acceptance.

In an additional embodiment herein, an initiating user may narrow his or her list of trusted users during any transaction including, but not limited to, appraising, selling, and buying transactions. In an embodiment of FIG. 10, the illustration presents a third sample screen display which could appear when working within an "Appraising" tab of the main navigation bar. This sample screen display could be accessed, for example, when a user wants to narrow his or her trusted users when obtaining an appraisal of a vehicle. Of the six trusted users selected in FIG. 2 above, the user has deselected two of them. When data is provided by the user's communication device to processor 120 for subsequent routing, such routing could be limited to devices of the four trusted users. Although FIG. 10 is drawn to an appraising transaction, the narrowing of trusted users could be included in other transactions including, but not limited to, selling and buying transactions.

The drawings of FIG. 11 depict a flowchart 200 of an example of a method for restrictively exchanging product data between communication devices of a limited-user network. The flowchart begins on FIG. 11A with module 202 with the establishing communication between a processor 120 and an initiating communication device 110a corresponding to an initiating user of a limited-user network 100. In one embodiment, data representative of log-on information of an initiating user may be stored with an initiating communication device 110a and provided to processor 120 when an initiating communication device 110a attempts to log-in to the network, which verifies the initiating user data with network user data previously stored in a data storage device 130. In another embodiment, data representative of an initiating user may be stored in a data storage device 130, and when an initiating communication device attempts to log-in to the network, log-on information may be inputted by a initiating user, and data representative of such log-on information may be provided to processor 120, which verifies the initiating user data with network user data previously stored in a data storage device 130.

The flowchart continues with module 204 with the receiving of initiating product data from the initiating communication device 110a by a processor 120. The initiating product data could be data representative of product information inputted by an initiating user. Such product information could comprise of product characteristics data units; for example, in a market trading vehicles, product characteristics data units could comprise vehicular characteristics data units. As embodied herein, the input information could be associated with a plurality of transactions including, but not limited to, an appraisal opportunity, a buy opportunity, or a sell opportunity.

The flowchart continues with module 206 with the receiving of first user data of the initiating user, where first user data could be trusted user data representative of trusted users selected by initiating user. As embodied herein, first user data could be received from an initiating communication device 110a and provided to processor 120 as input from an initiating user. Alternatively, first user data could be received by processor 120 retrieving first user data from a data storage device 130 corresponding to the data representative of the initiating user.

The flowchart continues with module 208 with determining the availability of one or more first user communication devices 110b and 110c corresponding to the first user data, where first user communication devices could be devices corresponding to trusted users when first user data corresponds to trusted user data. Availability of one or more first user communication devices 110b and 110c could depend on whether communication has been established between the processor 120 and such devices. If a first user communication device is not available, then the flowchart continues with module 220.

The flowchart continues with module 210 with the providing of initiating product data to available first user communication device(s).

The flowchart continues with module 212 with the receiving of responding product data by processor 120 from at least one responding user communication device, where the responding product data may be data responsive to the initiating product data for each responding first user communication device or second user communication device discuss below. Responding product data could be data representative of information inputted by a responding user, and such information could comprise product financial data units; for example, in a market trading vehicles, product financial data units could comprise vehicular financial data units.

The flowchart continues with module 214 with the providing of the responding product data to an initiating communication device 110a. Then, the flowchart proceeds to the end.

Figure 11A:
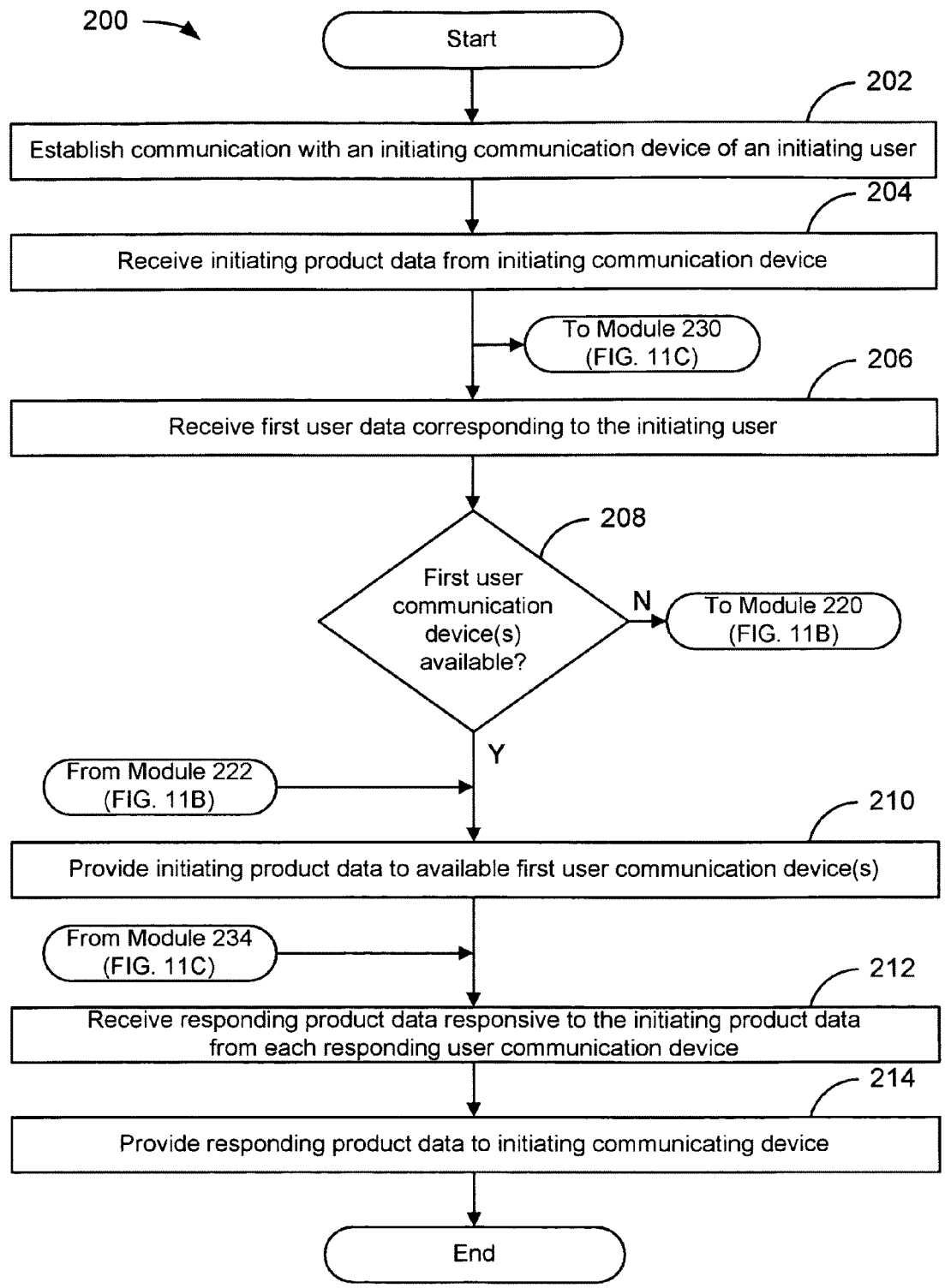
Figure 11B:
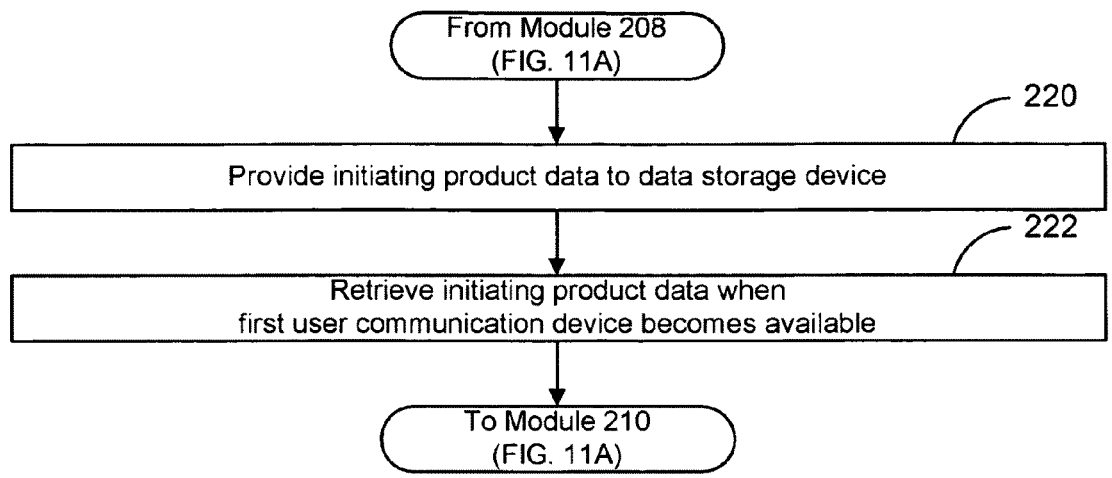

In an additional embodiment herein, if one or more first user communication devices are not available, then the flowchart continues to FIG. 11B with module 220 with the providing of the initiating product data to a data storage device 130.

The flowchart continues with module 222 with the retrieving of initiating product data when an unavailable first user communication device of module 208 becomes available when a communication connection with processor 120 has been established. With the addition of an available user communication device, the flowchart proceeds to FIG. 11A with module 210.

Figure 11D:
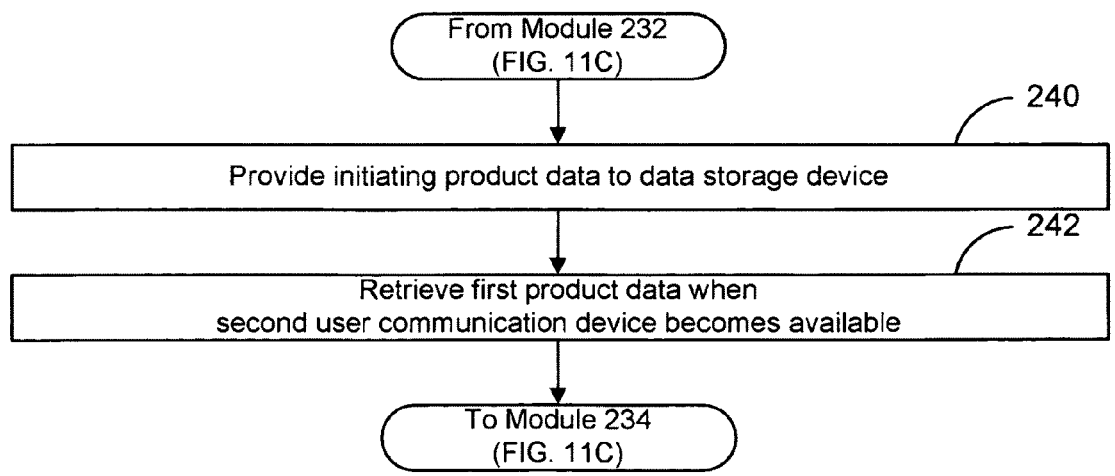
Figure 11C:
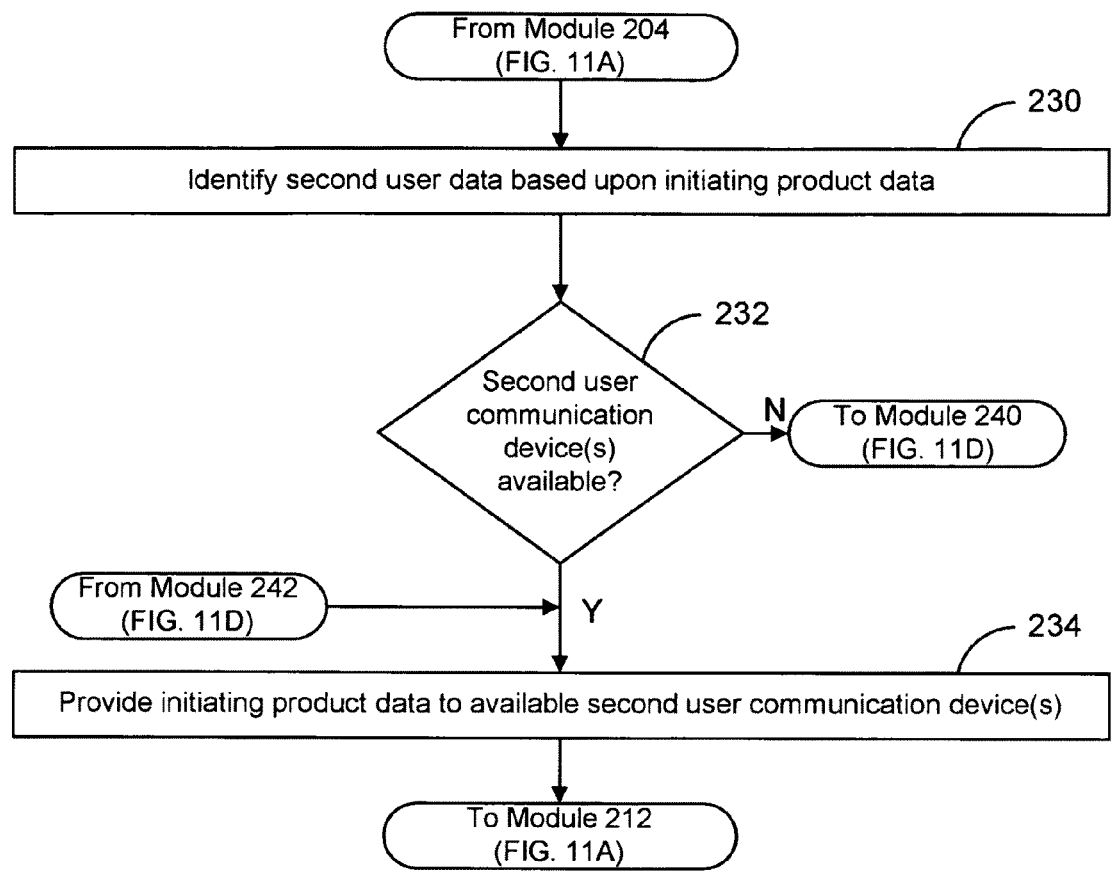

In an additional embodiment herein, the flowchart continues to FIG. 11C with module 230 with the identifying of second user data based upon to the initiating product data. Second users who have not been selected by an initiating user as a trusted user may nevertheless be interested in a product matching the product represented in the initiating product data. Second users who have an interest in a product could have provided processor 120 with data representative of such product, where such product date could have been stored in a data storage device 130. After receiving the initiating product data, processor 120 could conduct a search of data source 130 to identify one or more second users interested in the product represented in the initiating product data. That is, processor 120 could conduct a search of data source 130 to match second user product data with initiating product data.

The flowchart continues with module 232 with determining the availability of one or more second user communication devices 110d and 110e corresponding to the second user data, where second user communication devices could be devices corresponding to interested users when second user data corresponds to initiating product data. Availability of one or more second user communication devices 110d and 110e could depend on whether communication has been established between the processor 120 and such devices. If a second user communication device is not available, then the flowchart continues with module 240.

The flowchart continues with module 234 with the providing of initiating product data to available second user communication device(s). Then, the flowchart proceeds to FIG. 11A with module 212, wherein the responding product data may be data responsive to the initiating product data for each responding second user communication device as discussed above.

In an additional embodiment herein, if one or more second user communication devices are not available, then the flowchart continues to FIG. 11D with module 240 with the providing of the initiating product data to a data storage device 130.

The flowchart continues with module 242 with the retrieving of initiating product data when an unavailable second user communication device of module 232 becomes available when a communication connection with processor 120 has been established. With the addition of an available user communication device, the flowchart proceeds to FIG. 11C with module 234.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A communication system for restrictively exchanging and controlling product data between communication devices of a private network, said system comprising:
   a processor in communication with user communication devices of a private network intended for or restricted to the use of at least three pre-identified and pre-approved users sharing a common interest, where said processor is configured to:
      establish a communication connection with an initiating user communication device of an initiating user of the private network,
      receive initiating product data from the initiating user communication device,
      receive first user data of the initiating user, where
         the first user data is representative of at least one trusted user selected from the plurality of pre-identified and pre-approved users, and
         each trusted user has been selected by the initiating user,
      determine the availability of at least one first user communication device of a user of the private network,
      provide the initiating product data to at least one available first user communication device,
      identify second user data based upon the initiating product data, where the second user data is representative of at least one interested user of the private network not selected by the initiating user,
      determine the availability of at least one second user communication device,
      provide the initiating product data to at least one available second user communication device,
      receive responding product data responsive to the initiating product data from each responding user communication device of a responding user of the private network, and
      provide the responding product data to the initiating user communication device.

2. The communications system of claim 1, wherein each first user communication device corresponds to a trusted user.

3. The communications system of claim 1, wherein the first user data of the initiating user is received from the initiating user communication device.

4. The communications system of claim 1, wherein the processor receives the first user data of the initiating user by retrieving the first user data from a data storage device.

5. The communications system of claim 1, wherein the processor provides the initiating product data to a data storage device when at least one first user communication device is unavailable, and
   retrieves the initiating product data from the data storage device when an unavailable first user communication device becomes an available first user communications device.

6. The communications system of claim 1, wherein at least one responding user communication device is a first user communication device.

7. The communications system of claim 1, wherein each second user communication device corresponds to an interested user.

8. The communications system of claim 1, wherein the processor:
   provides the initiating product data to a data storage device when at least one second user communication device is unavailable, and
   retrieves the initiating product data from the data storage device when an unavailable second user communication device becomes an available second user communications device.

9. The communications system of claim 1, wherein at least one responding user communication device is a second user communication device.

10. A communication method for restrictively exchanging and controlling product data between communication devices of a private network, said method comprising:
    establishing a communication connection with an initiating user communication device of an initiating user of the private network,
    receiving initiating product data from the initiating user communication device,
    receiving first user data of the initiating user, where
       the first user data is representative of at least one trusted user selected from the plurality of pre-identified and pre-approved users, and
       each trusted user has been selected by the initiating user,
    determining the availability of at least one first user communication device of a user of the private network,
    providing the initiating product data to at least one available first user communication device,
    identifying second user data based upon the initiating product data, where the second user data is representative of at least one interested user of the private network not selected by the initiating user,
    determining the availability of at least one second user communication device,
    providing the initiating product data to at least one available second user communication device,
    receiving responding product data responsive to the initiating product data from each responding user communication device of a responding user of the private network, and
    providing the responding product data to the initiating user communication device.

11. The communications method of claim 10, wherein at least one first user communication device corresponds to a trusted user.

12. The communications method of claim 10, wherein the first user data of the initiating user is received from the initiating user communication device.

13. The communications method of claim 10, wherein the receiving of the first user data of the initiating user is accomplished by the retrieving of the first user data from a data storage device.

14. The communications method of claim 10, further comprising providing the initiating product data to a data storage device when at least one first user communication device is unavailable, and retrieving the initiating product data from the data storage device when an unavailable first user communication device becomes an available first user communications device.

15. The communications method of claim 10, wherein at least one responding user communication device is a first user communication device.

16. The communications method of claim 10, wherein each second user communication device corresponds to an interested user.

17. The communications method of claim 10, further comprising providing the initiating product data to a data storage device when at least second user communication device is unavailable, and retrieving the initiating product data from the data storage device when an unavailable second user communication device becomes an available second user communications device.

18. The communications method of claim 10, wherein at least one responding user communication device is a second user communication device.

* * * * *